April 21, 1936. A. W. MACHLET Re. 19,936
CARBURIZING PROCESS
Original Filed May 6, 1927
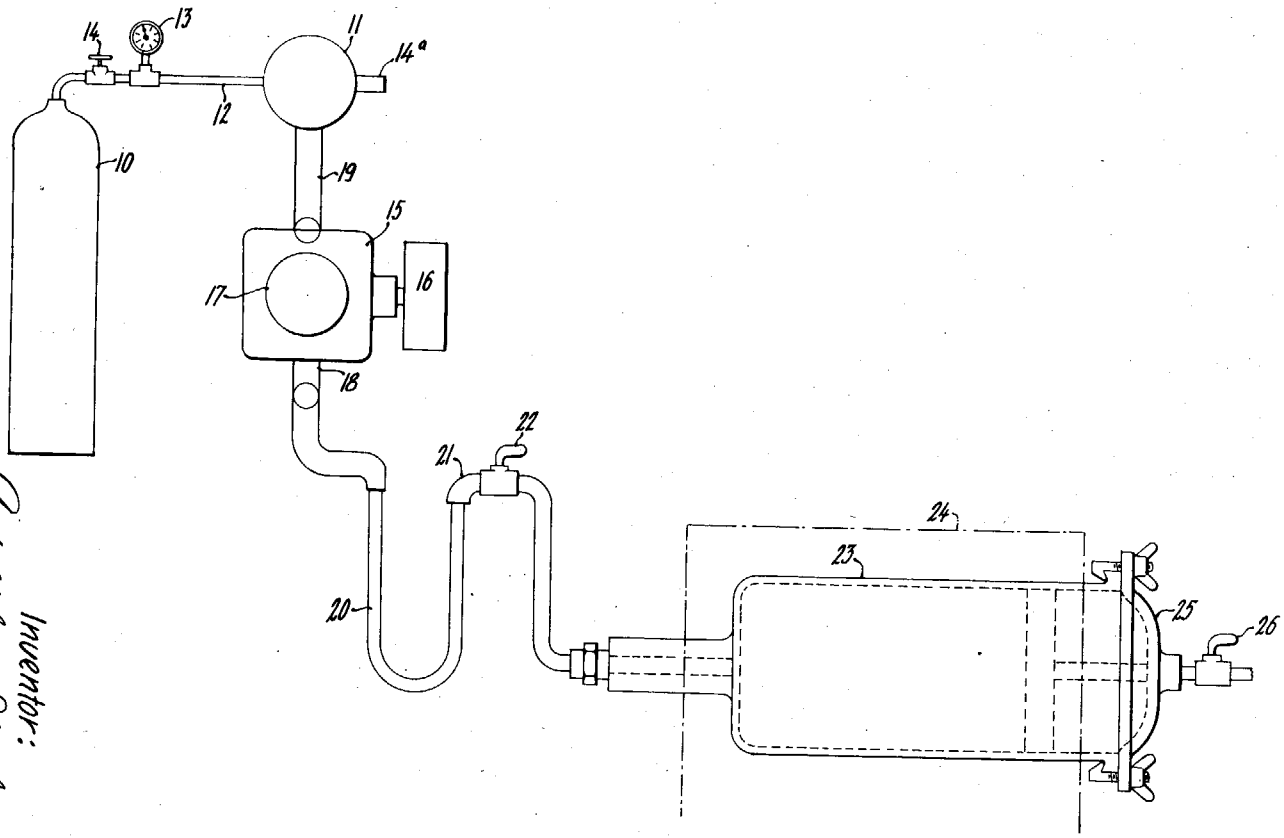
Inventor:
Adolph W. Machlet
by B. B. Stickney
Attorney Reissued Apr. 21, 1936

Re. 19,936

UNITED STATES PATENT OFFICE 19,936

CARBURIZING PROCESS

Adolph W. Machlet, Elizabeth, N. J.

Original No. 1,745,104, dated January 28, 1930, Serial No. 189,281, May 6, 1927. Application for reissue March 21, 1930, Serial No. 437,928

3 Claims. (Cl. 148—17)

This invention relates to an improved process or method for carbonizing or carburizing articles of iron and other ferrous metals. My United States Patent No. 1,337,244 may be referred to as describing the general type of apparatus which may be used in the practice of my present improved process.

One object of the present invention is to provide an improved process for utilizing the richer hydrocarbon gases, such for instance as propane, for carburizing articles of ferreous metal so as to obtain a surface hardened product of the highest degree of excellence and at a minimum of expense. Other objects will appear from the detailed description of a preferred embodiment of my process and one form of apparatus in which it may be practiced.

It has been found that gases rich in carbon are commercially available in liquid form at a low price and in a condition free from deleterious substances, such for instance as sulphur. There is only a limited market for such rich gases at present. Liquid propane, for instance, is very low in price in proportion to its carbon content, which determines its value as a carbonizing agent to a very large extent, so that by making available such rich gases by my present invention, I am often able to effect substantial savings. However, such rich gases have a marked tendency to deposit a troublesome quantity of carbon in the form of soot or of a thin layer of carbonaceous material detachably adhering to the work, when used undiluted. Such soot and carbonaceous material as well as being troublesome are wasteful of the carbon content of the gas, and one of the problems solved by my present invention is to avoid this deposit, in a cheap and efficient manner.

In practicing my present process the carburizing is carried on in a conventional heated closed retort which is often designed for rotation to agitate the enclosed articles. The temperature used in heating the retort is denoted in the claims as carburizing temperature. By this is meant a temperature such as is practically required to carburize the articles in the retort to effect a surface hardening, the carburizing temperature being between 1450° and 1750° F. as against much higher temperatures (2250 to 2350° F.) used in a process of purifying and refining iron into steel.

It has been found that the leaner hydrocarbons commercially available have a marked tendency to bear deleterious ingredients, such for instance as sulphur, and thus these leaner gases are undesirable for carburizing unless subjected to scrubbing or other processes to relieve them of the deleterious ingredients. It has been often found that such lean gases even though they are cheap per cubic foot and may be used in a practically undiluted state, are more costly to carburize with because many more cubic feet are required.

Propane is a gas at normal atmospheric pressure and temperature. It is liquefied to facilitate transportation and is usually shipped in flasks under a pressure of 110 pounds more or less per square inch. The liquid propane is then allowed to expand for use in my carburizing process.

A typical apparatus in which my improved process may be practiced and the process itself are hereinafter described with relation to a particular rich hydrocarbon gas, namely, propane, as follows:

Referring to the accompanying drawing:

The numeral 10 indicates a flask containing liquid propane. Flask 10 is provided with a control valve 14 from which the liquid propane flows at a reduced pressure indicated by gauge 13, thence through the pipe 12 into a bell, gasometer or gas and air mixer 11, wherein the liquid propane expands to gaseous form. Mixer 11 is also provided with an air inlet 14*a*, and the mixture in mixer 11 should contain about three or four parts of air to one part of propane gas. It may be noted that a ten to one mixture of air and gas is explosive but that the richer mixtures such as I prefer to use are comparatively non-explosive. Mixers such as the mixer 11 are usually provided with conventional adjustable means (not shown) for regulating the proportions of the volumes of the gases forming the different mixtures.

One well known apparatus for mixing the air and gas in any desired proportions is the Schematische Darstellung eines Selas-Apparates. In such apparatus air is drawn into the mixer through an inlet, for instance, inlet 14*a*. A pump 15, driven by a belt pulley 16, draws the mixture from the mixer 11, and may be provided with the automatic by-pass device 17. Such a by-pass 17 is well known and is frequently used in air or gas pumps, to permit the mixture to flow idly back from the discharge end 18 to the intake end 19 of the pump, when the pump is pumping the mixed gas and air faster than is required, or when the discharge of the pump is completely closed by, for instance, the valve 22, hereafter further described.

From the pump 15 a flexible hose 20 conducts the mixture to a pipe 21 in which there is provided a valve 22 to control the supply of the diluted gas to the revolving carburizing retort 23, which encloses the articles to be carburized, and the retort 23 is externally heated in a furnace 24. The retort and furnace may be constructed in the same manner as is disclosed in said United States Patent No. 1,337,244, to which reference has heretofore been made. In the drawing of the present application the revolving retort bears the numeral 23, the furnace 24, the retort cover 25, and the vent for spent carburizing gas 26.

Variations may be resorted to within the scope of the invention, portions of the improvements may be used without others, and the measure of the invention is defined by the appended claims.

I claim:—

1. The carburizing process consisting in providing liquid propane, permitting expansion of the liquid to gas form, reducing the expanded gas by adding thereto about three volumes of atmospheric air to one volume of the expanded gas, and carburizing iron or steel articles by heating them in an atmosphere of the gas so reduced, thereby substantially avoiding the faulty deposit of lamp black upon the articles.

2. The carburizing process consisting in providing liquid propane, permitting expansion of the liquid to form gas to a certain pressure above atmospheric, reducing the expanded gas while under pressure by the forcible addition thereto of about three volumes of atmospheric air to one volume of the expanded gas, and carburizing iron or steel articles by heating them in an atmosphere of the reduced gas under pressure above atmospheric.

3. The herein described method of carburizing, which comprises providing a commercial flask of liquid propane, permitting the liquid to flow from the flask at a reduced pressure such as will permit the liquid to expand to gas form, adding to said gas an amount of air as will form a non-explosive carburizing mixture, and carburizing iron or steel articles by heating them in the presence of said carburizing mixture.

ADOLPH W. MACHLET.